(No Model.)

G. W. BROWN.
LIQUID VESSEL.

No. 586,833.  Patented July 20, 1897.

WITNESSES:
L. N. Legendre
C. R. Ferguson

INVENTOR
G. W. Brown
BY Munn & Co.
ATTORNEYS.

UNITED STATES PATENT OFFICE.

GEORGE W. BROWN, OF WILLIAMSBURG, PENNSYLVANIA.

LIQUID VESSEL.

SPECIFICATION forming part of Letters Patent No. 586,833, dated July 20, 1897.

Application filed July 17, 1896. Serial No. 599,472. (No model.)

*To all whom it may concern:*

Be it known that I, GEORGE W. BROWN, of Williamsburg, in the county of Blair and State of Pennsylvania, have invented new and useful Improvements in Liquid Vessels, of which the following is a full, clear, and exact description.

This invention relates to vessels for containing liquid and solid matter; and the object is to provide a simple device by means of which the solid matter may be retained in the vessel while the liquid is being poured therefrom.

I have illustrated my invention and will describe it in connection with a drinking vessel or tumbler, the device being designed to retain ice, lemon-skins, and similar flavoring matter in the body of the vessel while the liquid is being drunk or being poured therefrom, but from the description it will be obvious that the invention may be applied to cooking vessels to retain the solid matter while the liquid is being drained therefrom and that it may be applied to ice-pitchers.

The invention consists in the construction and novel arrangement of parts, as will be hereinafter described, and particularly pointed out in the claims.

Reference is to be had to the accompanying drawings, forming a part of this specification, in which similar characters of reference indicate corresponding parts in both views.

Figure 1:
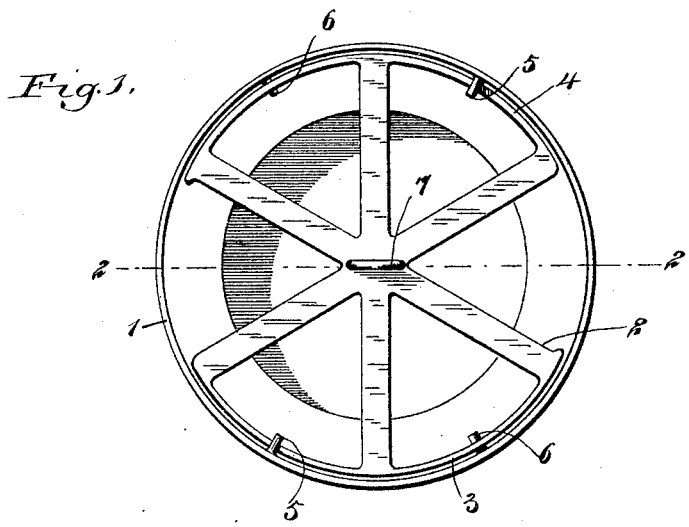
Figure 2:
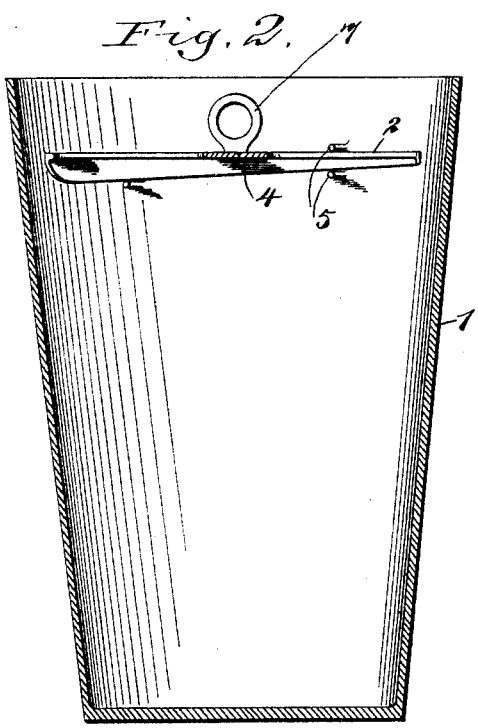

Figure 1 is a top plan view of a vessel, showing my invention as applied thereto; and Fig. 2 is a vertical section on the line 2 2 of Fig. 1.

Referring to the drawings, 1 designates a vessel, here shown as a drinking vessel or tumbler, and which may be of any desired shape or of any desired material—such, for instance, as glass or metal. Within the body portion of the vessel, and preferably near its top, is removably secured a cover 2. This cover 2 comprises a number of bars radiating from a common center, and whereby openings are provided between the bars for the escape of liquid, the bars, however, being designed to retain solid matter within the vessel. As here shown, there are six bars, three at one side being connected by a flange 3 and the three at the opposite side being connected by a flange 4. These flanges in cross-section extend at right angles, or substantially so, to the bars of the cover, and each flange is tapered longitudinally—that is, each flange is somewhat narrower at one end than at the other—this taper, as here shown, being provided on the under side.

Extended inwardly from the body of the vessel and at diametrically opposite sides thereof are pairs of lugs 5, designed to engage the top and bottom edges of the flanges 3 4, and lugs 6, extended inward from the body of the vessel at diametrically opposite points, are designed to engage the under side of said flanges. It will be seen that there is a space between adjacent ends of opposite flanges, so that when the cover is rotated a certain distance the same may be cleared from the lugs 5 and lifted from the vessel.

In placing the cover in the vessel the under sides of its flanges will be rested on the lugs 6. Then by a slight rotation of the cover its flanges may be extended between the pairs of lugs 5, and of course the greater the distance the said cover is turned the tighter the flanges will be wedged between the lugs 5. In removing the cover it is obvious that a reverse rotation must be made.

As before stated, the vessel may be made of any suitable material. The lugs may be formed integral therewith, and the cover may be made of metal or of fictile material, such as glass or porcelain. The center of the cover may be provided with a ring or finger-piece 7, by means of which it may be rotated and lifted from the vessel.

Having thus described my invention, I claim as new and desire to secure by Letters Patent—

1. The combination with a vessel provided on its inner surface with diametrically opposite and inwardly-projecting pins or lugs, of a skeleton cover fitted to rotate in the vessel between the lugs or pins, said cover having its periphery interrupted or broken at diametrically opposite points and provided with downwardly-projecting and tapered flanges, substantially as described.

2. The combination with a vessel provided on its inner surface with diametrically opposite pairs of lugs and with diametrically opposite lugs spaced from the pairs of lugs, of a cover consisting of bars radiating from a common center, the outer end of the bars at each side being connected by a flange forming an interrupted or broken periphery, said flanges extending downwardly at right angles to the bars and tapered longitudinally, substantially as herein shown and described.

GEORGE W. BROWN.

Witnesses:
CLARA E. ROLLER,
JEREMIAH WHITEHEAD.